Figure 1:
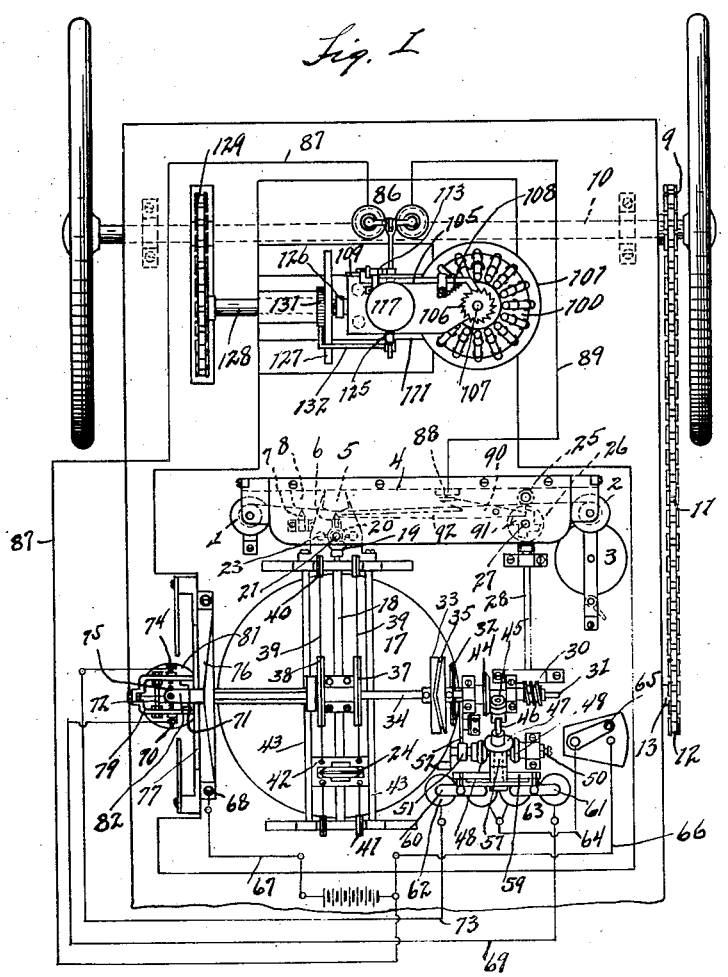

M. J. DIKEMAN.
SURVEYING INSTRUMENT.
APPLICATION FILED JAN. 2, 1913.

1,109,667.

Patented Sept. 8, 1914.
3 SHEETS—SHEET 1.

WITNESSES:

INVENTOR.
MYRON J. DIKEMAN.
BY
ATTORNEY.

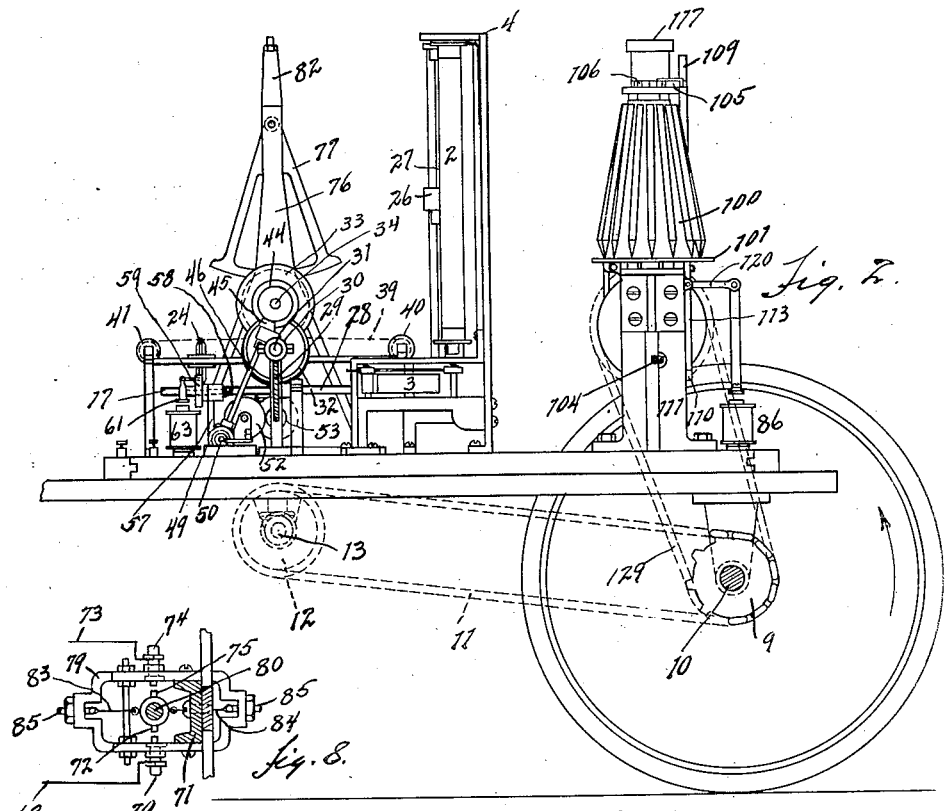
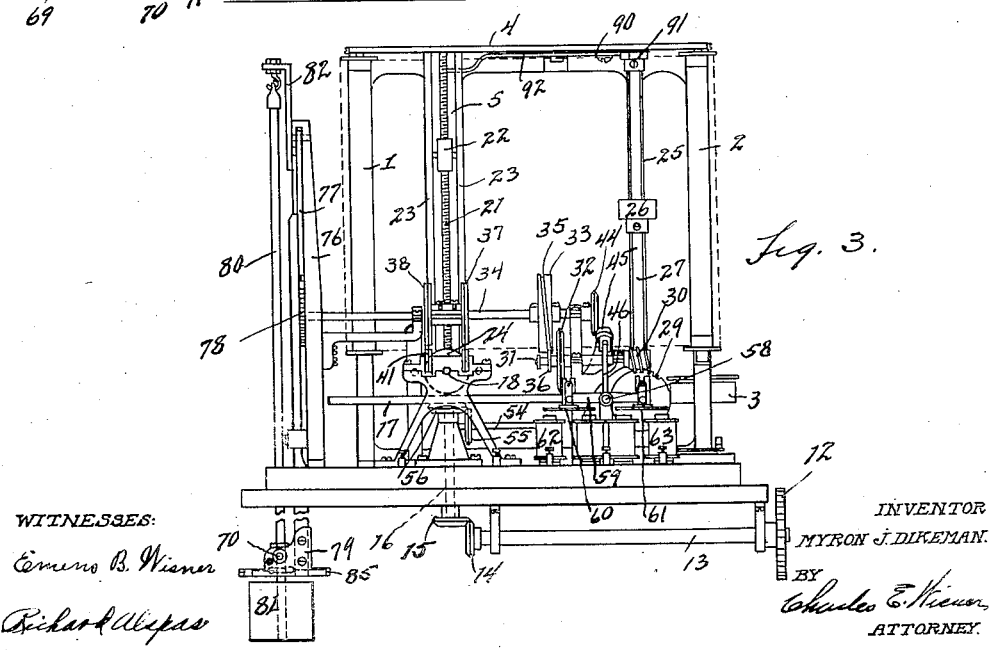

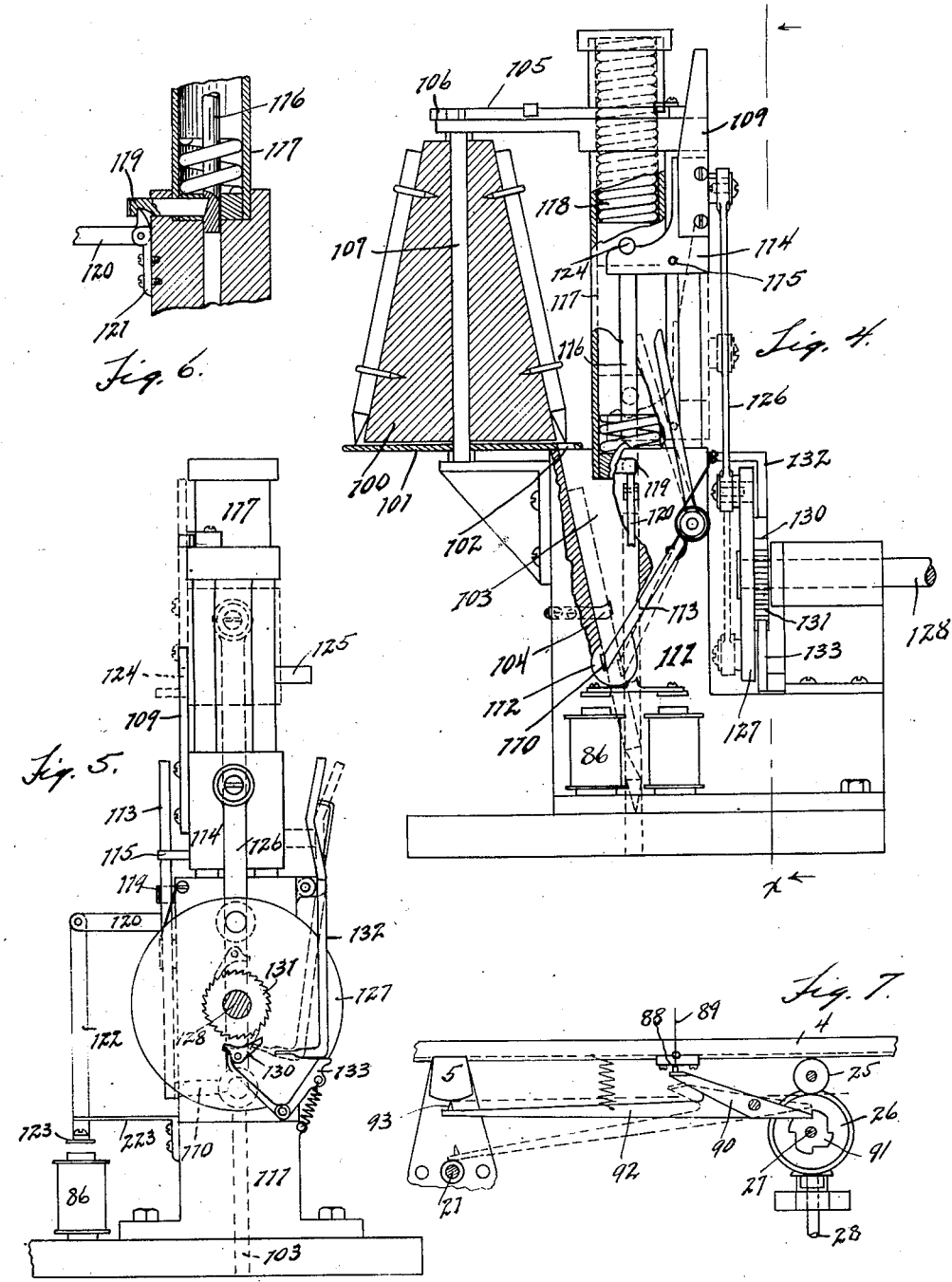

UNITED STATES PATENT OFFICE.

MYRON J. DIKEMAN, OF DETROIT, MICHIGAN.

SURVEYING INSTRUMENT.

1,109,667.  Specification of Letters Patent. Patented Sept. 8, 1914.

Application filed January 2, 1913. Serial No. 739,651.

*To all whom it may concern:*

Be it known that I, MYRON J. DIKEMAN, a citizen of the United States, residing at Detroit, county of Wayne, State of Michigan, have invented a certain new and useful Improvement in Surveying Instruments, and declare the following to be a full, clear, and exact description of the same, such as will enable others skilled in the art to which it pertains to make and use the same, reference being had to the accompanying drawings, which form a part of this specification.

This invention relates to surveying instruments and has for its object an instrument for automatically producing a delineation on a record sheet carried by the instrument of the profile of the ground over which it is passed and also for automatically introducing marker stakes into the ground at substantially equidistant points in a horizontal plane on the line traversed, the varying levels of which being shown on the record sheet relative to a datum or base line and on a reduced scale.

A further object is a device for the purpose stated that is simple in construction, automatic in operation, and accurate within the scope of the instrument.

These and further objects and novelties of the invention are hereinafter more fully described and claimed and shown in the accompanying drawings in which—

Figure 1 is a plan view of a device embodying my invention and showing the general relation of the parts thereof, their mode of operation, and the manner of their control whereby the various parts operate in timed relation one with the other. Fig. 2 is a side elevation of the instrument showing the general relation of the profile producing and marker setting parts of the device. Fig. 3 is a front elevation of the profile producing part of the device. Fig. 4 is an elevation, partly in section, of the market setting portion of the device. Fig. 5 is an elevation of the marker setting apparatus on line x—x of Fig. 4. Fig. 6 is a detail illustrating the means for releasing and for holding plunger utilized in setting the markers. Fig. 7 is a detail showing the means employed for controlling the operation of the marker-setting apparatus by the profile producing apparatus and also showing the means for indicating on the record sheet the relative point at which a marker is set in the ground. Fig. 8 is a detail of the lower end of the pendulum-rod and the inclosing swinging frame carrying electrical contacts engaged by contacts on the rod when the pendulum swings from the perpendicular.

Similar characters refer to similar parts throughout the drawings and specification.

The general principles involved in producing a delineation on the record sheet of the profile of the surface traversed by the instrument is disclosed in my Patent No. 958,794, bearing date of May 24th, 1910, but as the structure there shown has been departed from in several important particulars in the device here shown, in order to operate apparatus for setting markers in the ground and indicating on the record sheet the relative position of such markers and in other particulars hereinafter mentioned, the general operation of the device is here described to make clear the function of the various parts, their relation one to the other, and the method and means of timing the various operations.

The record sheet preferably used with the device is the ordinary printed profile paper bearing vertical and horizontal lines usually used in the making of profiles although any paper of the proper texture and form may be utilized if desired. A considerable length, fifty yards more or less, is wound on the roller 1 and is unwound therefrom and wound on the roller 2 by the action of a spring motor geared thereto indicated at 3, the position of the sheet being indicated by the dotted rectangle in Fig. 3. The motor tends to continuously operate the rollers but the speed of movement of the record sheet is accurately controlled in a manner hereinafter shown. The rollers 1 and 2 are mounted in an upright framework 4 shown more clearly in Figs. 2 and 3, and also secured to the framework is a block 5 extending from the lower to the upper part of the framework and the record sheet is made to draw tightly across this block as may be understood from Fig. 1 in which the line of the sheet is indicated by dotted lines. A marking device of any approved type or form contacts the sheet and presses against the block 5 producing a delineation of the profile of the ground on a reduced scale on the record sheet by reason of its movement in a vertical plane while the sheet moves in a horizontal plane, the manner of actuation of which being hereinafter described. A fixed marking device 7 is also provided at the lower part of the framework which traces the datum or base line on the sheet from which the levels shown by the profile line are computed and this marker 7 presses against the sheet at a point supported by the block 8.

It is to be noted that while the base line is traced on the sheet by reason of the movement of the sheet under the fixedly positioned marker 7, the profile line is a resultant of the combined movement of the sheet horizontally and movement of the marking device 6 vertically thereacross except at such times as the device is traversing a level surface when the profile line is produced by the movement of the sheet alone as at such period the marker 6 remains stationary.

In addition to producing a delineation of the profile of the surface traversed, a record of the line over which the device is passed is also made by inserting marker stakes in the ground at equidistant points in a horizontal plane which may subsequently be replaced with permanent stakes. As the apparatus may be ascending or descending an inclined plane and as the markers are to be set at equidistant points in a horizontal plane, the time-interval (considering the device is moved at constant speed) between the setting of the markers must be varied in accord with the length of line traversed in passing from one point in a horizontal plane to a succeeding point therein and this time interval is regulated by the profile producing apparatus as hereinafter described.

The entire apparatus is supported on the platform of a wheeled vehicle a portion of which is shown in Figs. 1 and 2 and motion is transmitted to the profile delineating part of the device by means of the sprocket 9 on the vehicle shaft 10, sprocket chain 11 and sprocket 12 on the horizontal shaft 13 as shown in said Figs. and in Fig. 3. The inner end of the shaft 13 is provided with a bevel gear 14 meshing with a similar gear 15 on the vertical shaft 16. This vertical shaft 16 extends up through the platform of the vehicle and at the upper end is attached a horizontally positioned driving disk 17. Above the disk 17 and extending longitudinally of the vehicle is a shaft 18 properly supported in bearings provided at each side of the disk 17. On one end of the shaft 18 is a bevel gear 19 meshing with a like gear 20 on a vertical screw threaded shaft 21 supported in the framework 4 as shown in Figs. 1 and 3. In threaded engagement with the shaft 21 is a boxing 22 which carries the marking device 6 heretofore mentioned. The boxing is held from rotation with the shaft 21 by means of the vertically positioned ways 23, 23 at each side of the shaft 21 which are engaged by laterally extending lugs on the boxing as shown in Fig. 3.

Movement is imparted to the shaft 18 by means of a friction wheel 24 splined thereon and held in engagement with the driving disk 17 and the speed of rotation of the shaft 18 and consequently the speed of movement vertically of the marker 6 is regulated by altering the point of contact of the friction wheel 24 on the disk 17. If the wheel 24 is near the outer edge of the disk 17, which as hereafter shown occurs at such times as the device is traversing a sharp incline, the speed of movement of the marker 6 is greater than when the wheel 24 is near the center of the disk which is the position assumed by the wheel when the device is traversing a nearly level surface. If the device be traversing a truly level surface, the friction wheel is positioned at the center of the driving disk and no rotation thereof takes place at which time the marker 6 remains stationary and traces a horizontal line on the record sheet by reason of the movement of the sheet only.

The base line traced on the record sheet by the fixedly positioned marking device 7 indicates the distance in a horizontal plane traversed by the device and the speed of movement of the record sheet must therefore be varied to accord with the time-interval required to pass over the surface the actual length of which may be greater than the distance traversed in a horizontal plane due to inclinations thereof. The speed of movement of the record sheet is therefore regulated in the following manner: A roller 25 is mounted vertically in the framework 4 back of the record sheet which is firmly gripped between said roller and a roller 26 on the vertical shaft 27 also mounted in the framework. Rotation of the shaft 27 and roller 26 thereon allows the record sheet to wind on to the winding roll 2 and the speed of rotation of the shaft 27 determines the speed of movement of the record sheet, the prime cause of which movement is the spring motor 3 heretofore described as being geared to the winding roll 2. Although not clearly shown, the lower end of the shaft 27 is provided with a bevel gear meshing with a like gear on the horizontally positioned shaft 28 extending longitudinally of the vehicle, and upon the outer end of the shaft is a worm wheel 29 engaged by a worm 30 on a shaft 31 positioned at right angles to the shaft 28 and extending over the driving disk 17. Splined on the shaft 31 is a friction wheel 32 contacting the driving disk and the speed of rotation of the shaft 31, shaft 28, and consequently the speed of movement of the record sheet, is determined by the position of the friction wheel 32 on the driving disk, that is—the nearer the wheel is to the outer edge of the driving disk the more rapidly it will rotate and vice versa. The position of the friction wheel 32 is regulated by a cam wheel 33 on a shaft 34 extending across and above the driving disk. The wheel 33 is provided with a circumferential cam groove 35 which, in passing about the wheel, gradually passes across the face thereof and back and the angle the groove forms to the perpendicular, as seen in Fig. 3, determines the scope of the machine. The friction wheel 32 is provided with a hub on which is a small wheel 36 engaging in the cam groove 35 and rotative movement of the cam wheel therefore alters the position of the friction wheel 32 on the driving disk. The cam wheel shaft 34 is also provided with a pair of grooved wheels 37 and 38 positioned centrally above the driving disk and a wire cable 39 for each wheel 37 and 38 is wound once thereabout and passes over idlers 40 and 41 mounted in bearings on opposite sides of the driving disk and beyond the periphery thereof as shown in Fig. 1. The free ends of each wire then passes beneath the grooved wheels 37 and 38 and are each attached to a sliding block 42 which rides in ways 43 extending between the supports for the idlers 40 and 41. The block 42 carries a friction wheel 24 splined on the shaft 18 heretofore mentioned and a rotation of the shaft 34 positions the friction wheel on the driving disk 17.

It is to be noted that the shaft 34 does not continuously rotate but, as hereinafter shown, is rotated to the right or left through an arc of greater or less degree by means of apparatus controlled by a pendulum whose relative vertical position is determined by the inclination of the surface traversed, and therefore, that the position of the friction wheels 24 and 32 on the driving disk is regulated by variations in the inclination of the surface traversed. It is also to be noted that the speed of horizontal movement of the record sheet should be decreased and the speed of vertical movement of the marking device 6 increased as the degree of inclination increases and vice versa due to the fact that the length of the line traversed on an inclined plane is greater than the distance between any two points on the line in a horizontal plane shown by the datum or base line. Consequently, in turning the shaft 34 to position the friction wheel 32 nearer the center of the driving disk 17 to decrease the speed of movement of the record sheet, the arrangement of parts is also such as to position the friction wheel 24 nearer the periphery of the driving disk 17 to increase the speed of vertical movement of the marking device 6 and the profile line traced thereby is truly representative of the slope traversed. The same result is achieved whether the device be ascending or descending a slope as in passing down a slope the friction wheel 24 is moved across the driving disk on the opposite side of the center thereof occupied by the wheel when ascending a slope and the shaft 18 therefore rotated in the opposite direction at a speed corresponding to the degree of inclination. The friction wheel 32, however, will occupy the identical position on the driving disk whether the device be ascending or descending a slope as the point on the cam groove engaged by the wheel 36 in either case will be at an equal distance either way from the neutral point engaged when the device is traversing a level surface.

The shaft 34 may be rotated by means of the bevel gear 44 thereon which meshes with a bevel gear 45 on the inclined shaft 46, shown in Figs. 1, 2, and 3. Although not clearly shown, the shaft 46 should be attached by means of a universal joint to a stub shaft on which the gear 45 is mounted in order to allow the shaft 46 to swing and bring the gear 47 on the lower end thereof into engagement with either bevel gear 48 or 49 on the horizontal shaft 50 which is continuously operated by means of the spur gear 51 thereon meshing with an idler gear 52 which in turn meshes with the spur gear 53 on the shaft 54. The shaft 54 is operated by means of a bevel gear 55 thereon meshing with the bevel gear 56 on the vertical shaft 16 as seen in Fig. 3. The shaft 50 is thus continuously rotated and if the bevel gear 47 is thrown into mesh with the gear 48, the shaft 46 and consequently the shaft 34 will rotate in one direction and if the gear 47 be thrown into mesh with the gear 49 the shaft 34 will be rotated in the opposite direction. Also, if the gear 47 and shaft 46 be allowed to remain in a neutral position, the shaft 34 will remain idle. To rock the shaft 46 and produce the stated movements of the gear 47, the lower end thereof is hung in a bearing in the rock arm 57 attached to the rock shaft 58. Secured to the rock shaft is a lever 59 upon opposite ends of which are secured the armatures 60 and 61 of the magnets 62 and 63 respectively and the lever 59, rock shaft 58, and inclined shaft 46 may be rocked by closing an electric circuit through one or the other of said magnets 62 and 63. The flow of current to either of said magnets is controlled by a pendulum free to swing in a single vertical plane, the electric circuits being so arranged that the circuit controlling either magnet may be closed by a swinging of the pendulum in one direction or the other caused by the apparatus assuming a position at an inclination to a horizontal plane. The circuits controlling the magnets are shown diagrammatically in Fig. 1. Both sets of magnets have a line 64 in common connected to a switch 65. From the switch a line 66 connects to one side of the battery and from the opposite side of the battery a line 67 connects to the metal frame of the machine at 68. The magnet 63 is also provided with a line 69 connected with the contact point 70 carried at the lower end of the vertically positioned, pivoted, channel bar or frame 71 and insulated therefrom as may be seen in Fig. 8. The pendulum rod also carries a contact point 72 so that when the device is descending a slope the pendulum swings forward until the contact 72 engages the contact 70 and thus closes the circuit through the metal frame of the machine. Thereupon the shaft 46 is rocked and the gear 47 engages the gear 49. In like manner the magnet 62 is provided with a line 73 connecting it with the contact point 74 carried by the channel frame 71 and the circuit controlling the magnet is closed when the instrument is ascending a slope by reason of the pendulum swinging backward and the contact 75 thereon engages the contact 74. This last mentioned movement of the pendulum closes the circuit to and energizes the magnet 62 which draws the armature 60 downward, rocks the shaft 46 and throws the gear 47 into mesh with the gear 48 which rotates the shaft 34 in a direction opposite to that caused by energizing the magnet 63.

It is apparent that should the gear 47 remain in mesh with either gear 48 or 49, the shaft 34 would continuously rotate and, as it is desired that the shaft should rotate only to such extent that the friction wheels 24 and 32 may be properly positioned on the driving disk 17 to produce the speed of movement of the marking device 6 and the record sheet required by reason of the inclination of the slope traversed, provision is made whereby the contacts closed by the swinging of the pendulum either forward or back is broken practically as soon as the shaft 34 starts to rotate.

The means employed to break the contacts 70—72 and 74—75 is shown in Figs. 1—2—3 and 8. A standard 76 is attached to the base of the machine and the heretofore mentioned channel frame 71 is pivoted to the standard near the top thereof. Fixedly attached to the frame 71 is a gear segment 77 which meshes with a spur gear 78 on the end of the shaft 34. The lower end of the frame 71 carries an open frame 79 in which are secured the contact points 70 and 74 and through the frame 79 passes the pendulum rod 80 carrying the contact points 72 and 75 in axial alinement with the companion points 72 and 74. Below the frame 79, the pendulum rod is provided with a bob 81 and the upper end of the rod 80 is pivotally supported from the bracket 82 attached to the fixed standard 76. As may be seen in Fig. 8, the pendulum rod is held by the wires 83 and 84 in such manner that it may oscillate only in a single vertical plane in order that the contacts may always be in alinement. Each wire 83 and 84 is secured at each outer end to the frame 79 by the adjusting screws 85, 85 and the inner ends are attached to the pendulum rod. These wires prevent movement of the pendulum in a direction longitudinally thereof but flex sufficiently to allow the contacts to come into engagement upon oscillation of the pendulum crosswise of the wires as the movement necessary to make contacts is only about $\frac{1}{32}$ of an inch at this point. As before stated, if one set of contact points are brought into engagement by reason of movement of the pendulum due to the device ascending or descending a slope, one or the other of the magnets 62 or 63 is energized throwing the bevel gear 47 into mesh with one or the other of the bevel gears 48 or 49 on the shaft 50 thus rotating the inclined shaft 46 and bevel gear 45 meshing with the bevel gear 44 on the shaft 34 and this turning of the shaft 34 also turns the gear 78 and swings the channel frame 71 by means of the segment 77 attached thereto which breaks the contacts made by the pendulum and allows the bevel gear 47 to fall to neutral position. It is to be noted that this movement of the frame 71 is always in the same direction as the pendulum tends to swing and the contacts will continue to be alternately made and broken until the frame and pendulum assume a parallel relation with neither contact closed. It therefore becomes evident that if the device be ascending or descending a slight inclination, this parallel relation is assumed sooner than if traversing an inclination of greater degree and this is productive of the desired result inasmuch as the greater the degree of inclination the greater the degree of rotation required of the shaft 34 to properly position the friction wheels 24 and 32 on the driving disk to produce the necessary variation in the speed of movement of the marking device 6 and the record sheet to accord with the various time-intervals required to traverse the inclinations encountered.

As heretofore mentioned, a marker stake is set in the ground at equidistant points in a horizontal plane on the line traversed thereby producing a visible record of the line and, as hereafter shown, the record sheet is marked to indicate thereon the relative points at which a marker is set in the ground. In order that no inaccuracies may result the stake setting and record making occur simultaneously and are controlled by the same timing device. The setting of a marker state results from releasing a spring impelled plunger by means of a latch withdrawn upon the energization of a magnet 86. The circuit for controlling the magnet is shown diagrammatically in Fig. 1 in which the line 87 is shown as connecting one coil with one side of the battery, the other side of which is connected to the metal frame at 68. The other coil of the magnet is connected to the insulated contact 88 by the wire 89. Pivoted to the upper part of the framework 4 is a spring actuated contact lever 90, shown more clearly in Fig. 1, and one end of the lever is engaged by a notched wheel 91 on the shaft 27 whose speed of rotation is controlled in the manner heretofore described. Rotation of the shaft 27 and wheel 91 raises the free end of the lever out of engagement with the contact point 88 which remains out of contact therewith until the end of the lever drops into a notch in the wheel 91 as shown in full lines in Fig. 7 whereupon the circuit is completed and the coil 86 energized as one side of the battery is connected to the frame and the lever 90 forms part of the circuit. As heretofore stated, the record sheet is allowed to move at varying speeds to accord with the length of line traversed which movement is caused by rotation of the roller 2 under the action of the spring motor 3 and controlled by the rollers 25 and 26. The wheel 91 being on the shaft 27 of the roller 26, therefore rotates in accord with the varying speed of the record sheet which corresponds with the distance traversed in a horizontal plane and the stakes are consequently set at equal distances apart in a horizontal plane, the spacing being determined by the number of notches in the wheel 91 which may be more or less than shown depending upon the spacing desired.

The lever 90 is provided with a laterally extending arm 92 provided with a prick point or other means of marking the record indicated at 93 which is in vertical alinement with the profile marking device 6. At the time the lever 90 assumes the position shown in full lines in Fig. 7, the point 93 strikes or contacts the record sheet indicating thereon the point at which a marker stake has been set in the ground, or, to be more exact, the point makes a mark on the sheet near the upper edge and if a line be drawn therefrom to the base line and at right angles therewith, the point at which the line intersects the profile line is the relative point at which the stake has been set.

The marker setting portion of the device is shown more fully in Figs. 4 and 5 and comprises a revoluble, cone-shaped, stake holder 100 beneath which is a stationary plate 101 having an aperture 102 located above the stake receiving channel 103 in the supporting block or base 111, and, as the holder is intermittently revolved, the stakes, which are loosely held by staples as shown in Fig. 5, successively drop into the receiving channel one side of which may be considered as forming a continuation of and at the same angle as the cone surface of the holder. The stake, therefore, enters the channel at an angle to the perpendicular and falls beneath a restraining spring 104 which yieldably holds the stake and prevents it from assuming a perpendicular position of its own accord which would allow it to fall out of the lower end of the channel 103. The stake holder is revolved by means of the spring restrained lever 105 the end of which is adapted to engage the teeth of a ratchet wheel 106 secured to the holder shaft 107. The lever 105 is moved in one direction by a spring 108, indicated in Fig. 1, and is moved in the opposite direction to engage the ratchet by the operating bar 109 when it is raised to the position shown in full lines in Fig. 4. When the operating bar reaches this position, a stake drops into the receiving channel and rests above a flat spring 110 extending laterally into the block 111 in which the channel is formed through the opening 112 therein. The spring 110 is secured to the end of the spring controlled lever 113, the normal position of which is shown in full lines in Fig. 4, and as the operating bar 109 and the block or head to which it is secured, descend in the manner hereinafter shown, a pin 115 on the block engages the free end of the lever 113 forcing it into the position shown by dotted lines in said figure and this movement of the lever 113 sets the stake upright in the channel and holds it in such position by means of the spring 110. At this period the plunger 116 carried in the tubular casing 117 secured to the base 111 in vertical alinement with the receiving channel is in its uppermost position and the coil spring 118, which propels the plunger and engages the head thereof, is under compression and is so held by the latch 119 shown more clearly in Fig. 6 which engages a notch in the plunger. As shown in said figure, the latch is also engaged by the short arm of the rock lever 120 pivoted to the bracket 121 and the long arm of the lever is attached to the vertically positioned bar 122 to the lower end of which is secured the armature 123 of the magnet 86, held in normal position by the spring bar 223. When the magnet is energized, as before described, the plunger 116 is released which drives the stake out of the receiving channel with sufficient force to insert it to some extent into the ground beneath the vehicle. As shown in Fig. 6, a buffer spring is located at the bottom of the tubular casing adapted to relieve the apparatus of shock incident to the discharge of a stake by the plunger. The plunger is reset preparatory to a succeeding operation by the sliding head or block 114 which is provided with arms extending each side of the tubular casing which engage beneath pins 124 and 125 attached to the plunger head. The block 114 is raised by means of the pitman 126 attached to the wheel 127 loosely mounted on the shaft 128 which is continuously rotated by the chain 129 driven by a sprocket on the vehicle shaft 10. The wheel 127 has a pawl 130 attached thereto and secured to the shaft 128 is a ratchet wheel 131, the normal position of the parts being shown in full lines in Fig. 5. A spring controlled lever 132 is pivoted to one side of the base 111 one end of which is formed to engage the pawl 130 and the opposite is formed and so positioned as to be engaged by the pin 125 on the plunger in descending. The normal position of the lever 132 is shown in full lines in Fig. 5 and when the plunger descends the pin 125 forces the lever into the position shown by dotted lines in said figure which forces the pawl into engagement with the continuously rotating ratchet wheel and the loosely mounted wheel 127 is thereupon rotated and the block 114 and the plunger 116 raised at which time the pawl has assumed the position shown by dotted lines in Fig. 5 and in full lines in Fig. 4. As the parts reach this position, the latch 119 engages the notch in the plunger and the wheel 127 is relieved of strain whereupon the wheel and pawl return to normal position. As the wheel and pawl approach the normal position, the pawl is released from engagement with the ratchet wheel and is stopped in position by being engaged by one end of a spring controlled lever 133 pivoted to the base 111 the opposite end of which is at this interval held by the end of the lever 132. Movement of the lever 132 to engage the pawl releases the lever 133.

From the above description it becomes evident that the marker setting apparatus operates in conjunction with and is controlled by the profile producing portion of the device and that the continuously operating shaft 128 is only utilized to reset the apparatus for successive operations, the time-interval between which being controlled by the pendulum as above set forth.

Having thus briefly described my invention and its mode of operation, what I claim and desire to secure by Letters Patent of the United States is—

1. In apparatus of the character described, a vehicle, a record sheet carried thereby, a marking device adapted to produce a line on said sheet, means operated by movement of the vehicle for moving the marking device across the sheet, means for moving the sheet at right angles to the direction of movement of the marking device, means for regulating the speed of movement of the marking device and of the record sheet, means for making a visible record of the line traversed on the surface passed over by the vehicle, said last mentioned means being controlled by the means for regulating the speed of movement of the record sheet.

2. In apparatus of the character described, a vehicle, a record sheet carried thereby, a movable marking device for producing a profile line on said sheet, a stationary marking device for producing a datum line on the sheet, means actuated by movement of the vehicle for moving the profile marking device across the sheet, means for simultaneously moving the record sheet at right angles to the direction of movement of the profile marking device, means for regulating the speed of movement of the profile marking device and of the record sheet, and means for making a visible record of the line of the line traversed on the surface passed over by the vehicle, said last mentioned means being controlled by the means for regulating the speed of movement of the record sheet.

3. In apparatus of the character described, a vehicle, a record sheet vertically positioned thereon, a movable marking device for producing a profile line on said sheet, a stationary marking device for producing a datum line on said sheet, means for moving the movable marking device vertically across the sheet, means for simultaneously moving the record sheet horizontally, means for regulating the speed of movement of the record sheet whereby the datum line produced by said movement is indicative of the distance traversed by the vehicle in a horizontal plane, means for regulating the speed of movement of the movable marking device whereby the line traced thereby is indicative of the surface distance traversed, and means for setting markers in the surface on the line traversed at equidistant points in a horizontal plane.

4. In apparatus of the character described, a vehicle, a record sheet carried thereby, a movable marking device for producing a profile line on said sheet, a stationary marking device for producing a datum line on said sheet, means for moving the movable marking device across the sheet, the line of said movement being fixed, means for simultaneously moving the record sheet at right angles to the direction of movement of the movable marking device, means for regulating the speed of movement of the record sheet whereby the datum line produced by said movement is indicative of the distance in a horizontal plane traversed by the vehicle, means for regulating the speed of movement of the movable marking device whereby the line traced thereby is indicative of the surface distance traversed, means for setting markers in the surface on the line traversed, means controlled by the speed regulating means of the record sheet whereby the markers are set in the surface at equidistant points in a horizontal plane, and means for indicating on the record sheet the relative point at which the markers are set.

5. In apparatus of the character described, a vehicle, a record sheet vertically positioned thereon, a movable marking device for producing a profile line on said sheet, the sheet being movable horizontally and the marking device movable vertically, a friction disk rotated by movement of the vehicle, a friction wheel engaging the disk for controlling the speed of movement of the marking device, a second friction wheel engaging the disk for controlling the speed of movement of the record sheet, means set in operation by alterations in the inclination to a horizontal plane of the surface traversed for positioning the friction wheels on the friction disk whereby the speed of movement of the marking device and of the record sheet may be altered to accord with the surface distance traversed, means for setting markers in the surface on the line traversed, and means controlled by said second friction wheel for regulating the spacing of the markers.

6. In apparatus of the character described, a vehicle, a record sheet carried thereby, means actuated by the movement of the vehicle adapted to produce a delineation of the surface traversed on the record sheet, means for producing a datum line on said sheet indicative of the horizontal distance traversed, marker setting apparatus carried by the vehicle, and means for actuating said apparatus to set the markers in the surface traversed at equidistant points in a horizontal plane, said means being controlled by the apparatus involved in the producing of the datum line.

7. In apparatus of the character described, a vehicle, a record sheet movably supported thereon, a movable marking device for producing a profile line on said sheet, a stationary marking device for producing a datum line on the sheet, means actuated by the movement of the vehicle for moving the marking device across the sheet, means also actuated by the movement of the vehicle for moving the record sheet at right angles to the direction of movement of the marking device and simultaneously therewith, apparatus controlled by electric circuits for regulating the speed of the marking device and of the record sheet, a pendulum oscillatable by alterations in the degree of inclination to a horizontal plane of the surface traversed, and means whereby oscillation of the pendulum may close one or another of said circuits.

8. In apparatus of the character described, a vehicle, a record sheet carried thereby, a movable marking device for producing a profile line on said sheet, a stationary marking device for producing a datum line on the sheet, means actuated by movement of the vehicle for moving the profile marking device across the sheet, means for simultaneously moving the record sheet at right angles to the direction of movement of the marking device, apparatus controlled through the medium of electric circuits for regulating the speed of movement of the profile marking device and of the record sheet, a pendulum oscillatable by alterations in the degree of inclination to a horizontal plane of the surface traversed and adapted to close one or another of said circuits, a marker setting apparatus, for intermittently setting markers in the surface traversed, electrically controlled apparatus for regulating the time of operation of the marker setting apparatus, an electric circuit for energizing said electrically controlled apparatus, means controlled by the record sheet moving means for closing said circuit and thereby discharging a marker from the marker setting apparatus, and means operated by the movement of the vehicle for resetting the marker setting apparatus preparatory to a succeeding operation thereof.

In testimony whereof, I sign this specification in the presence of two witnesses.

MYRON J. DIKEMAN.

Witnesses:
CHARLES E. WISNER,
RICHARD ALSPAS.